United States Patent [19]

Kornrumpf et al.

[11] 3,930,193

[45] Dec. 30, 1975

[54] SCR INVERTER SYSTEMS

[75] Inventors: William P. Kornrumpf; John D. Harnden, Jr., both of Schenectady, N.Y.

[73] Assignee: General Electric Company, Schenectady, N.Y.

[22] Filed: Aug. 2, 1973

[21] Appl. No.: 384,988

[52] U.S. Cl. ............... 321/2; 219/10.77; 321/18; 321/21; 323/DIG. 1
[51] Int. Cl.² ............... H02M 5/45; G05F 1/44
[58] Field of Search ............... 321/2, 45, 12, 21, 43, 321/18; 323/DIG. 1, 4, 9, 17; 219/10.77

[56] References Cited
UNITED STATES PATENTS

| | | | |
|---|---|---|---|
| 2,836,784 | 5/1958 | Gross | 323/68 X |
| 3,366,867 | 1/1968 | Dodge | 321/45 R |
| 3,387,228 | 6/1968 | Randall | 321/18 |
| 3,457,489 | 7/1969 | Gentry, Jr. et al. | 323/68 X |
| 3,585,491 | 6/1971 | Petersen | 321/2 X |
| 3,713,013 | 1/1973 | Phillips | 321/45 R X |
| 3,733,519 | 5/1973 | Griffey | 323/DIG. 1 |
| 3,737,755 | 6/1973 | Calkin et al. | 321/21 |
| 3,761,796 | 9/1973 | Jensen | 321/2 |
| 3,821,630 | 6/1974 | Kornrumpf et al. | 321/12 X |
| 3,839,668 | 10/1974 | Black | 321/21 |

*Primary Examiner*—Gerald Goldberg
*Attorney, Agent, or Firm*—Jerome C. Squillaro; Joseph T. Cohen

[57] ABSTRACT

An A.C. to D.C. to A.C. inverter system including a current controlling element connected between a source of D.C. voltage and an SCR inverter is described. The current controlling element, responsive to various circuit parameters, such as load current, power or instantaneous SCR voltage, maintains the circuit parameters within safe limits. Current controlling elements such as transistors, SCR's, thermistors, pressure sensitive resistors and other current controlling devices are described.

13 Claims, 4 Drawing Figures

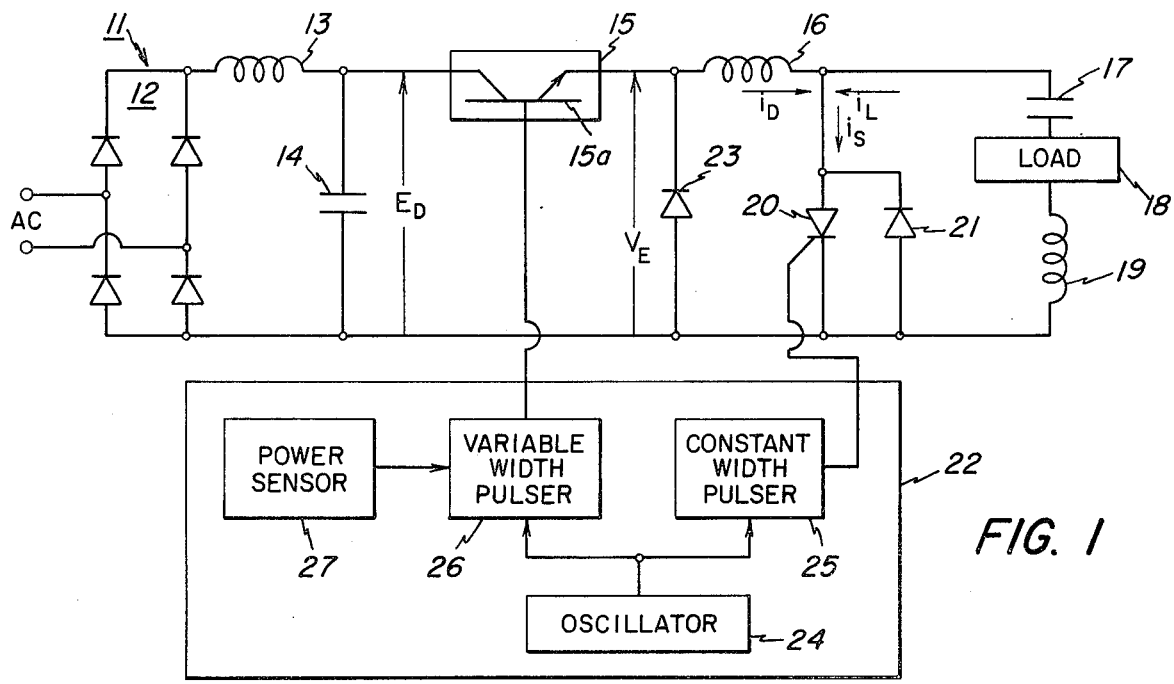
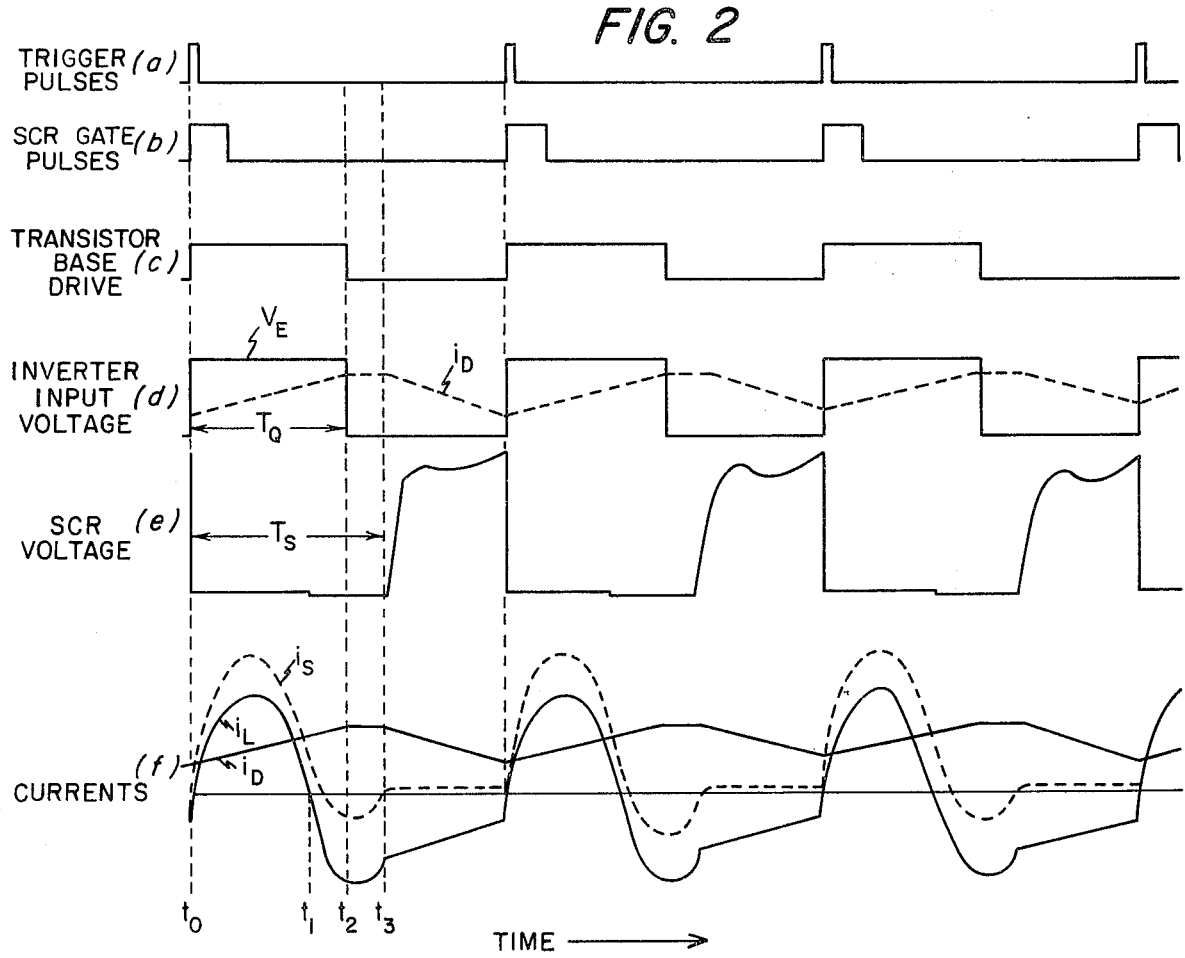

SCR INVERTER SYSTEMS

The present invention relates to electrical conversion systems and, more particularly, to A.C. to D.C. to A.C. inverters with automatic control means responsive to load and line variations.

Direct current to alternating current (D.C. to A.C.) and alternating current to direct current to alternating current (A.C. to D.C. to A.C.) inverters employing silicon controlled rectifiers are widely employed for numerous industrial applications. There is, however, an emerging field of consumer applications wherein SCR circuits are useful in such consumer appliances as electric heating control for ranges, small appliance motor control, battery charging devices, lighting and numerous other consumer applications based on the need for other than 60-cycle power.

Several factors have contributed to the delay in commercialization of these products for consumer applications. In particular, several of these applications require constant power into variable impedance loads or variable power into constant impedance loads while maintaining a substantially constant frequency of operation. Prior art techniques of varying the frequency of operation of the SCR inverter are not satisfactory since accoustical interference and electromagnetic interference (in addition to semiconductor device limitations) dictate a fairly narrow band of frequency variations, e.g., 20–30 kHz. Further, these requirements have not been easily satisfied with inexpensive SCR circuits and hence the introduction of new consumer products has been impeded.

Another factor which has tended to limit the use of SCR circuits in consumer appliances is the requirement of reliability and maintenance-free circuitry consistent with low cost requirements. Since an SCR can not inherently turn itself off, a commutating element must be employed for this purpose. However, to insure that commutation occurs reliably, large and expensive components, such as capacitors and inductors are required. For 60-cycle single phase appliance operation, for example, these component costs become prohibitively high and hence SCR's have not been widely employed for consumer appliances.

It is therefore an object of this invention to provide an SCR inverter system which overcomes the foregoing difficulties and provides economical power control of an SCR inverter.

It is a further object of this invention to provide a simple method and apparatus for controlling current in an SCR inverter.

It is a further object of this invention to provide an A.C. to D.C. to A.C. inverter with current limiting in the reset inductor.

It is yet a further object of this invention to provide an SCR inverter having a substantially constant output frequency with varying load impedances.

Briefly, these and other objects of our invention are achieved in accord with one embodiment thereof wherein an A.C. to D.C. to A.C. inverter system including an SCR inverter is provided with a current controlling means serially connected between a source of D.C. voltage and the SCR inverter. In one embodiment of our invention, the SCR inverter includes an SCR operatively connected in parallel relation with a series resonant circuit comprising a capacitor, an inductor and a load. Means are provided for sensing the power applied to the load and for altering the current flow through said series connected current controlling means as a function of the load impedance to insure reliable SCR commutation while maintaining the frequency of the SCR inverter substantially constant.

A better understanding of our invention as well as other objects and further advantages thereof will become more apparent to those skilled in the art from the following detailed description, taken in conjunction with the accompanying drawings in which:

FIG. 1 is a simplified schematic diagram of a typical inverter circuit in accord with one embodiment of our invention;

FIG. 2 illustrates typical waveforms associated with the operation of the inverter of FIG. 1.

Figure 3:
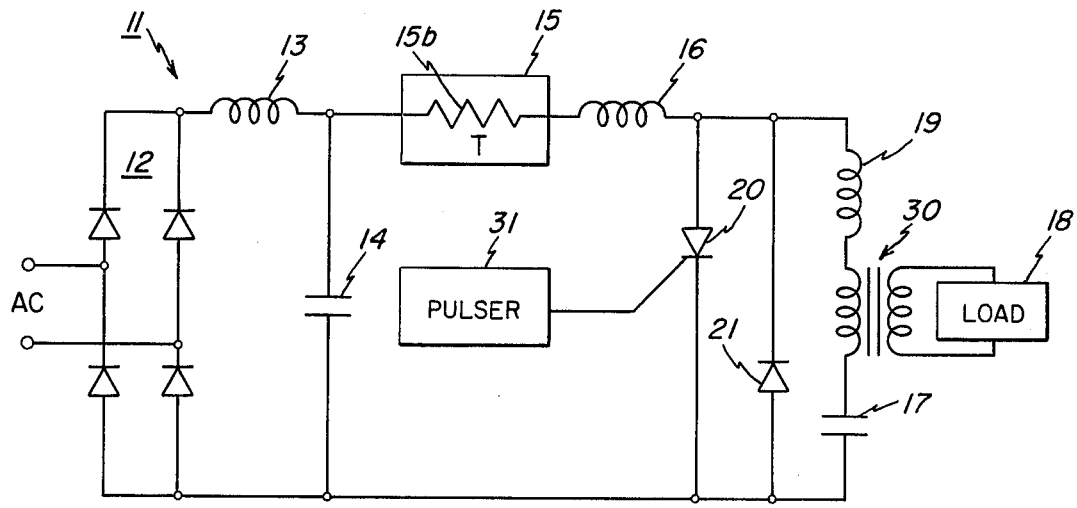
FIGS. 3 and 4 illustrate simplified schematic diagrams of alternative embodiments of our invention.

FIG. 1 illustrates schematically an A.C. to D.C. to A.C. inverter system 11 in accord with one embodiment of our invention. The inverter system 11 comprises a diode bridge 12 connected to an A.C. line, such as a 115 volt, single phase 60-cycle line. The A.C. line voltage is converted to pulsating D.C. by the diode bridge 12 where it is filtered through a filter choke 13 and a filter capacitor 14 to produce a unidirectional D.C. voltage, $E_D$. The unidirectional D.C. voltage is connected to one terminal of a current controlling means 15, illustrated in this embodiment of our invention as a transistor 15a. A second terminal of the current controlling means 15 is connected to an inverter circuit comprising a reset reactor 16 serially connected with a capacitor 17, a load 18 and an inductor 19. An SCR 20 having an oppositely poled diode 21 connected in parallel relationship with the SCR 20 is connected in parallel with the resonant load circuit comprising capacitor 17, load 18 and inductor 19. As is customary, the natural resonant frequency of the capacitor 17 and inductor 19 is higher than that of the gating pulses provided to the gate electrode of the SCR 20 from a controller 22. A diode 23, connected from the output terminal of the current controlling means 15 to the cathode of the SCR 20, provides a path for the reset current $i_D$ when the current controlling means 15, illustrated as the transistor 15a in this embodiment of our invention, is in a non-conducting state.

The controller 22 which provides gating pulses to the SCR 20 and the transistor 15a includes an oscillator 24, a constant width pulser 25, a variable width pulser 26, and a sensor 27, illustrated in this embodiment of our invention as a power sensor. The output of the constant width pulser 25 is connected to the gate electrode of the SCR 20 and the output of the variable width pulser 26 is connected to the base electrode of the transistor 15a.

The operation of the inverter circuit of FIG. 1 is best described in conjunction with the waveforms of FIG. 2. In normal operation, the SCR 20 and the current controlling means 15 are gated simultaneously from the controller 22. Line a of FIG. 2 illustrates the trigger pulses from the oscillator 24 which establish the frequency of operation of the inverter 11. Lines b and c respectively, illustrate the SCR gating pulses and the transistor base drive pulses which are synchronized with the trigger pulses from the oscillator 24. The conduction time, $T_Q$, of the transistor 15a may vary, for example, from approximately 5 to 95% of the full cycle time, and determines the desired power level applied to the load 18. As will be described more fully below, in accord with one embodiment of our invention the conduction time of the current controlling means 15 is varied as a function of the power required by the load 18.

Line $d$ of FIG. 2 illustrates the SCR inverter input voltage, $V_E$, (also the output voltage of the current controlling means 15). Line $e$ illustrates the voltage on the SCR 20 and diode 21. Line $e$ also illustrates the conduction time, $T_S$, of the SCR 20 and diode 21. This conduction time is determined by the resonant circuit (capacitor 17 and inductor 19) impedance, load impedance 18, and the current level in the reset reactor 16 but is not directly affected by the turn off time of the current controlling means 15. The current $i_D$ in the reset reactor 16, however, is determined by the conduction times of the current controlling means 15, the SCR 20 and the diode 21 since the SCR inverter input voltage $V_E$ is impressed across the reset reactor 16 when both the current controlling means 15 and the SCR-diode combination are in conduction.

In normal operation, as shown on line $f$ of FIG. 2, the current in the resonant load, $i_L$, is a damped sine wave with a peak value much larger than the direct current, $i_D$, in the reset reactor 16. On each firing of the SCR 20, a positive half sine wave of current flows into the load 18 (time, $t_0$ to $t_1$) followed by a negative half sine wave ($t_1$ to $t_3$). Since the negative half sine wave of the load current, $i_L$, is still larger than the direct current, $i_D$, there is a period of net forward current in diode 21. This forward current in diode 21 provides a reverse bias voltage of approximately 3/4 to 1 volt on SCR 20, which lasts for a sufficiently long period of time to permit SCR 20 to recover its blocking capability. After the current, $i_S$, in the SCR 20 and diode 21 becomes approximately 0, the direct current $i_D$, flows into the resonant load, recharging capacitor 17 in preparation for the next cycle of operation.

The embodiment of our invention illustrated in FIG. 1 with a serially connected current controlling means between a source of unidirectional voltage and an SCR inverter circuit provides numerous advantages over inverter systems without the serially connected current controlling means. In particular, the current controlling means permits constant power to be delivered to a variable load or, if desired, variable power to a constant load. In each mode of operation, the frequency of the inverter remains substantially constant and the desired power control is effected by controlling the duration of the pulse applied to the base electrode of the transistor 15a. More specifically, under conditions where it is desired to maintain a certain specified power lever in a variable load, the power sensor 27 senses the variation in power delivered to the load 18 and controls the width of the pulse issuing from the variable width pulser 26 to maintain the specified power level. For example, if the load impedance should change so that the power delivered to the load changes, the power sensor 27 senses this change in power and varies the width of the pulse applied to the base of the transistor 15a in such a manner to maintain constant power in the load. Those skilled in the art can readily appreciate that in addition to power control, other circuit parameters may be controlled in a similar manner merely by changing the power sensor 27 to a different type sensor. For example, the peak SCR voltage can be maintained within specified limits merely by employing a peak voltage sensor across the SCR 20. Similarly, the current flow through the reset inductor 16 can be maintained to a specified peak level merely by monitoring the current flow through the reset reactor 16. Further, those skilled in the art can appreciate that the sensor need not sense the power, voltage or current directly, but may sense a circuit parameter proportional to or representative of the desired circuit parameter.

The embodiment of our invention illustrated in FIG. 1 has numerous unique features which are particularly significant in consumer appliances, such as heating elements, lighting and battery charging applications. For example, where independent control of multiple loads are required, such as may be encountered in "heating elements" in an electric range, the inverter of our invention enables multiple loads to be connected to a common D.C. voltage power source without fear of commutation interaction between the inverters and with substantial cost saving. Further, since only a single D.C. voltage supply may be used for multiple inverters, larger size components are required in the A.C. to D.C. converter. However, the increased costs associated with larger size components which will handle the increased power requirement are substantially less costly than the cost associated with multiple A.C. to D.C. converters employing components of lesser power handling capability. Likewise, the total volume of space occupied is substantially reduced.

Further, as a result of our improved inverter system, an electric range system, for example, can be cost optimized; that is, the great diversity in range power consumption can be factored into the power supply design. Part of this design reflects itself in allowing greater ripple and regulation during periods of greatest total power utilization, but with no compromise in system reliability and continuity of operation. In previously described inverter systems constructed in accord with the prior art, stringent commutation requirements would not have permitted the use of any less than a full rated total KVA power supply system with minimum ripple and regulation. Accordingly, the ability to employ a single A.C. to D.C. converter which provides power to multiple loads greatly improves the cost effectiveness of converters constructed in accord with our invention.

Still another advantage of inverters constructed in accord with our invention is the improved power factor reflected back on the line. More specifically, by converting the A.C. to D.C., the peak power requirements are reduced. Further, because of the ability to utilize larger components in the A.C. to D.C. converter, the D.C. voltage will have substantially less ripple and better voltage regulation.

FIG. 1 illustrates the current controlling means 15 as a transistor; however, those skilled in the art can readily appreciate that in view of the above teachings other current controlling devices, such as SCR's, thermistors, triacs, thermally responsive or pressure responsive elements or combinations thereof may also be employed if desired.

By way of further example, FIG. 3 illustrates an alternative embodiment of our invention wherein the current controlling means 15 is illustrated as a thermistor 15b and the load 18 is coupled to the inverter circuit through a transformer 30. Other circuit components similar to those illustrated in FIG. 1 have like reference numerals. The diode 23, illustrated in FIG. 1, is not needed in this embodiment of our invention because some current can flow through the thermistor 15b at all times. In this embodiment, the SCR 20 is gated with a pulser 31.

Operationally, the embodiment of our invention illustrated in FIG. 3 is similar to that described above with reference to FIG. 1 except that the thermistor 15b is selected to have a temperature coefficient of resistance which varies in accord with a desired load current characteristic. For example, by employing a positive temperature coefficient of resistance thermistor, increases in load current will increase the resistance of the thermistor thereby reducing the current flow into the load. Conversely, a negative temperature coefficient of resistance thermistor would increase the current into the load.

A negative temperature coefficient of resistance thermistor is particularly useful for increasing the power delivered to the load where slight increases in the frequency of operation are not objectionable. This feature of our invention is particularly significant since it permits substantial increases in power delivered to the load with only slight increases in frequency of operation. This results from the fact that as current increases in the load, the resistance of the negative temperature coefficient of resistance thermistor decreases, thereby further increasing the current into the load. Accordingly, where conditions permit, the frequency of the inverter may be varied to achieve an additional means for controlling power delivered to a load.

Those skilled in the art can readily appreciate that combinations of thermistors having both positive and negative coefficients of resistance may be serially connected to produce specific load current characteristics. Obviously, this embodiment of our invention also eliminates the need for an additional power sensor since the thermistor itself functions as a combined sensor and current controlling means. Furthermore, those skilled in the art can appreciate that whereas the load circuit in FIG. 3 is driven from a transformer 30 with a specific inductor 19 serially connected with the transformer 30 and capacitor 17, where the transformer 30 is selected to have sufficient leakage reactance, the inductor 19 can be eliminated.

Figure 4:
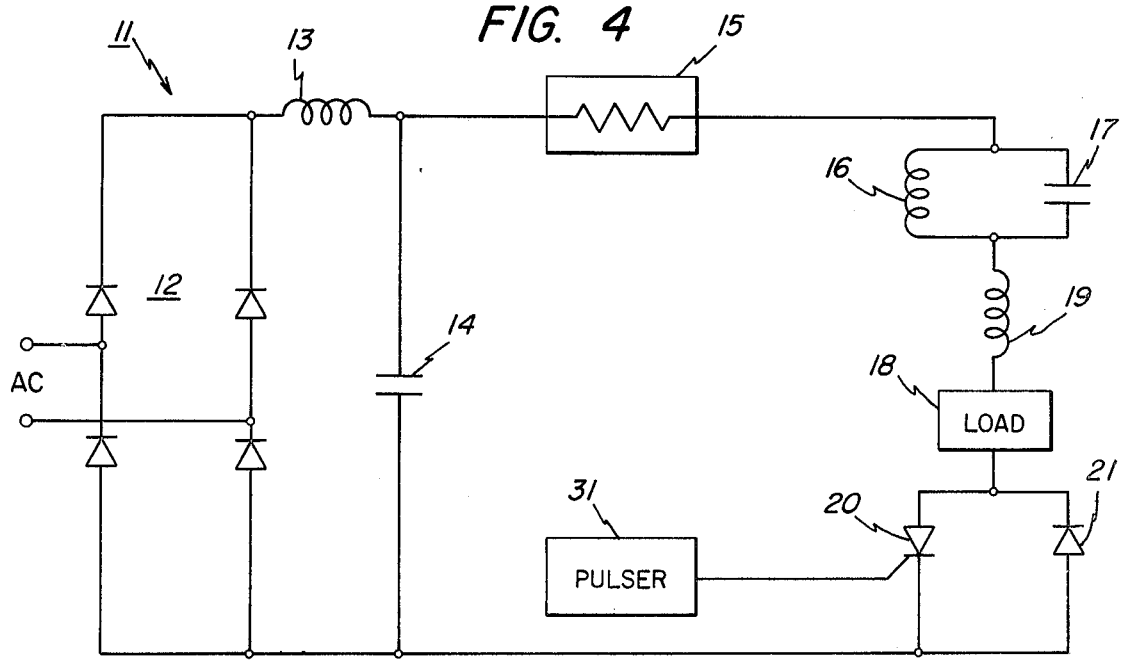

Still another embodiment of our invention is illustrated in FIG. 4. In this embodiment, the reset inductor 16 and capacitor 17 are connected in parallel and in series relation with the inductor 19, the load 18, and the SCR 20. The current controlling means 15 may comprise, for example, a thermistor, a potentiometer in which the resistance is made to vary in accord with the desired load current, or a pressure sensitive resistor which is also responsive to load current, if desired. As noted previously, circuit parameters other than load current may be monitored and maintained within safe limits by this same technique. For example, peak SCR voltage or peak reset reactor current may be maintained within safe limits by this same technique. Accordingly, our invention is not limited merely to load current control.

In addition to the advantages enumerated above with regard to the use of a current controlling means serially connected between a D.C. voltage source and an SCR inverter circuit, still other advantages flow from our invention. For example, where the current controlling means is responsive to load current, if the load impedance becomes exceedingly low, such as may result from a short circuit, the commutating circuit including capacitor 17, inductor 19 and diode 21 are protected from excessively high currents by the current controlling means. Hence, in designing the commutating circuit it is not necessary to provide a large commutation margin (as is done in the prior art) to insure continuous commutation. By the use of the current controlling means in accord with our invention, excessively high load currents are prevented from flowing into the load merely by increasing the impedance of the current controlling means. For example, where the current controlling means is a transistor, the width of the base drive pulse is reduced sufficiently to prevent excessive current flow into the load. Where the current controlling device is a thermistor, for example, having a positive temperature coefficient of resistance, increased current flow automatically increases the impedance of the thermistor and hence current flow into the load is thereby limited.

In addition to the advantages enumerated above, the addition of a series connected current controlling element between a D.C. voltage source and an SCR inverter permits optimization of the commutation margin required for reliable operation without appreciably altering system efficiency. More specifically, by optimizing the commutation margin, the commutation losses are reduced and hence any losses introduced by the current controlling element are offset by the reduced losses in the commutating components. In summary, we have disclosed novel inverter systems employing current controlling devices connected between a D.C. voltage source and a load. The various current controlling elements may be used separately or in any desired combination to satisfy specific load characteristics. For example, certain load conditions, such as short circuits, and rapid load changes, require fast acting (microsecond) semiconductor current controlling elements, and such have been described herein. Such current controlling elements eliminate the need for massive inductors required for controlling the rate of current flow.

The inverter system of our invention also provides protection for overload conditions which, in general, vary more slowly and are adequately handled by the thermally responsive current controlling elements described above.

In view of the foregoing description, those skilled in the art can readily appreciate that numerous modifications and variations of our invention are possible. For example, although our invention has been described with reference to a single SCR inverter, those skilled in the art can appreciate that the invention may be adapted for use in inverters employing two or more SCR's. Further, while the use of transistors and thermistors has been illustrated as suitable current controlling means, obviously other current controlling means may be employed without departing from the spirit and scope of our invention. Further, those skilled in the art can appreciate that the current controlling means may comprise one or more series connected elements such as a thermistor and a transistor, two thermistors, or other suitable combinations of current controlling devices. It is therefore to be understood that still other changes may be made in the particular embodiments of the invention described which fall within the full intended scope of the invention as defined by the appended claims.

What we claim as new and desire to secure by Letters Patent of the United States:

1. An improved direct current-to-alternating current inverter system comprising:

an SCR inverter adapted to be connected to a load, said inverter including a series resonant load circuit including an inductor, a capacitor and said load with an SCR connected in parallel relationship with said circuit;

a current controlling means having one terminal operatively connected to said SCR inverter and another terminal adapted to be connected to a D.C. voltage source, said means controlling the application of said D.C. voltage source to said SCR inverter;

frequency control means for maintaining the operation of said inverter at a substantially constant frequency, said frequency control means providing variable width gating signals to said current controlling means for controlling the duration of time said D.C. voltage source is applied to said SCR inverter and constant width gating signals to said SCR for controlling the conduction of said SCR; and means responsive to inverter system variations for altering the width of said variable width gating signals to ensure reliable SCR commutation as said SCR inverter maintains a substantially constant frequency of operation independently of said system variations.

2. The improved inverter of claim 1 wherein said current controlling means comprises a transistor and said transistor is electrically connected to said inverter with a reactor.

3. The improved inverter of claim 1 wherein said current controlling means comprises a transistor and said means for altering the width of said variable width gating signals includes means for sensing the power applied to said load.

4. The improved inverter of claim 1 wherein said means for altering the width of said variable width gating signals includes a peak voltage sensor sensing the voltage across said SCR.

5. A method of controlling the current into a D.C. to A.C. inverter system wherein said inverter system includes a current controlling device adapted to be connected between a single SCR inverter and a source of D.C. voltage, said method comprising:

sensing the voltage, current or power into said single SCR inverter;

altering the duration of time said D.C. voltage source is applied to said SCR inverter in response to said sensing step by controlling the conduction of said current controlling device to maintain reliable SCR commutation; and maintaining said SCR inverter at a substantially constant frequency of operation substantially independent of voltage, current or power variations of said inverter system.

6. The method of claim 5 wherein said current controlling device comprises a transistor and the step of altering the duration of time said D.C. voltage source is applied to said SCR inverter includes:

controlling the duration of the conduction time of said transistor as an inversely related function of the current into said SCR inverter system.

7. An A.C. to D.C. to A.C. inverter system comprising:

means for converting an A.C. voltage source to a D.C. voltage source;

an SCR inverter adapted to be connected to a load, said inverter including a series resonant load circuit including an inductor, a capacitor and said load with an SCR connected in parallel relationship with said circuit;

current control means connected between said D.C. voltage source and said SCR inverter for controlling the application of said D.C. voltage source to said SCR inverter; and frequency control means for maintaining the operation of SCR inverter at a substantially constant frequency, said means including an output providing variable width gating signals to said current control means for controlling the duration of time said D.C. voltage is applied to said SCR inverter and constant width gating signals to said SCR for controlling the conduction of said SCR.

8. The inverter system of claim 7 wherein said current control means comprises a transistor and said inverter system further includes a variable width pulser connected to the base electrode of said transistor.

9. The inverter system of claim 8 further comprising means responsive to current variations in said load for altering the width of the pulses from said variable width pulser.

10. The inverter system of claim 8 further comprising means responsive to a current in the inverter representative of the commutation margin.

11. The inverter of claim 11 wherein said inductor in said series resonant circuit comprises one winding of a transformer, the other winding of the transformer being connected to said load.

12. The inverter of claim 7 wherein said converting means comprises rectification means adapted to be connected to an A.C. voltage and filter means connected to said rectification means to provide said D.C. voltage.

13. The inverter of claim 8 further comprising:

means for providing substantially constant frequency pulses to said variable width pulser and the gate electrode of said SCR to establish the frequency of operation of said inverter system.

* * * * *